United States Patent [19]

Kim

[11] Patent Number: 5,412,495
[45] Date of Patent: May 2, 1995

[54] LIQUID CRYSTAL DISPLAY SYSTEM HAVING AN ANTI-STATIC ELECTRICITY STRUCTURE

[75] Inventor: Kwang-su Kim, Kyunggi-do, Rep. of Korea

[73] Assignee: Samsung Display Devices Co., Ltd., Kyunggi-do, Japan

[21] Appl. No.: 213,100

[22] Filed: Mar. 15, 1994

[30] Foreign Application Priority Data

Jul. 22, 1993 [KR] Rep. of Korea ............ 93-13723 U
Jul. 22, 1993 [KR] Rep. of Korea ............ 93-13724 U
Jul. 22, 1993 [KR] Rep. of Korea ............ 93-13725 U
Jul. 22, 1993 [KR] Rep. of Korea ............ 93-13726 U

[51] Int. Cl.$^6$ ............................................ G02F 1/343
[52] U.S. Cl. .................................. 359/88; 359/62; 359/74
[58] Field of Search ............... 361/212, 220; 348/818, 348/820; 359/62, 74, 87, 88

[56] References Cited

U.S. PATENT DOCUMENTS

| | | | |
|---|---|---|---|
| 4,847,602 | 7/1989 | Altland et al. ........................ | 345/10 |
| 5,063,474 | 11/1991 | Igarashi ................................ | 361/220 |
| 5,247,291 | 9/1993 | Kazusaka et al. .................... | 345/46 |
| 5,283,677 | 2/1994 | Sagawa et al. ....................... | 359/88 |

FOREIGN PATENT DOCUMENTS

| | | |
|---|---|---|
| 1-59320 | 3/1989 | Japan . |
| 1-59321 | 3/1989 | Japan . |
| 2-221936 | 9/1990 | Japan . |
| 2-254421 | 10/1990 | Japan . |

*Primary Examiner*—Jeffery Brier
*Attorney, Agent, or Firm*—Christie, Parker & Hale

[57] ABSTRACT

To provide a liquid crystal display having an anti-static electricity structure which can prevent a display error caused by a static electricity generated during manufacturing process and remained on an anti-electrical charge layer, the present invention provides a liquid crystal display system comprising: a pair of panels respectively having common electrodes and segment electrode; an insulating layer formed on each common and segment electrodes; an anti-electric charge layer formed on the insulating layer; a first earth pattern contacting the anti-electrical charge layer and formed at more than one of each common and segment electrode; and a second earth pattern formed at a circuit board and connected with the first earth pattern to earth a static electricity in a liquid crystal.

10 Claims, 3 Drawing Sheets

LIQUID CRYSTAL DISPLAY SYSTEM HAVING AN ANTI-STATIC ELECTRICITY STRUCTURE

BACKGROUND OF THE INVENTION

1. Field of the Invention

This invention relates to a liquid crystal display LCD system having an anti-static electricity structure and, more particularly, to a liquid crystal display system which can prevent a display error caused by a residual static electricity in the LCD.

2. Description of Conventional Art

In general, a flat display device which can decrease an equipment space compared with a cathode ray tube may be classed in five types, for example, a liquid crystal display, a plasma display panel, a electro luminescence, and a vacuum fluorescent device.

The liquid crystal display displays a picture by using characteristic of twist or dispersion of liquid crystal under the effect of an electric field and selecting a light. The liquid crystal may be classified as a smetic liquid crystal, a nematic liquid crystal, and a cholesteric liquid crystal. The nematic liquid crystal is commonly used for information display and classified again as a twisted nematic TN, a super twisted nematic STN, a double super twisted nematic DSTN and so forth in accordance with a twist angle determined by a rubbing angle of an orientation layer.

As a means for selecting the light, a pair of polarizers crossed to each other are well known.

Referring to FIG. 5, an LCD system comprises an LCD element including a pair of panels 52,53 having common electrodes 50 and segment electrodes 51 respectively; a frit seal for maintaining a predetermined gap between the panels and for sealing up the panels; and a pair of orientation layers 55 covering the common electrodes 50 and the segment electrodes 51 respectively, the common and segment electrodes 50 and 51 being crossed to each other for forming a matrix shape.

An insulating layer is formed each between one orientation layer 55 and the common electrode 50, and the other orientation layer 55 and the segment electrode 51. Further, an anti-electrical charge layer 57 for preventing a static electricity is formed each between one orientation layer 55 and one insulating layer 56, and the other orientation layer 55 and the other insulating layer 56.

The LCD system further comprises a connecter 58 connecting the pair of panels 52,53 to each other, and a circuit board having a driver chip 59.

The LCD system further comprises a back light 61 such as an electroluminescence element mounted between the circuit board 60 and the LCD element. The connecter 58 contacts the lead pattern 62 extending from each of the electrodes 50, 51 and contacts a pattern(not shown) of the circuit board 60 having the same pattern with the lead pattern 62.

A predetermined pattern is put on the orientation layer through a rubbing process, so that the liquid crystal can have a regular characteristic. The insulating layer 56 between the orientation layer 55 and the electrodes 50,51 prevents a short-circuit occurred between the electrodes 50,51.

That is, since a certain liquid crystal of a pixel is twisted in advance by the residual static electricity, the pixel spots, such that the display error occurs. Accordingly the anti-electrical charge layer widely disperses the static electricity to alleviate the spot, thereby decreasing the display error.

However, alleviating the spot by widely dispersing the static electricity to decrease the spot is not effective when the capacity of the static electricity is large.

Further, there is a problem that non-selected pixel is driven by the static electricity, thereby occurring a malfunction.

SUMMARY OF THE INVENTION

Accordingly, the present invention has been made on an effort to solve the above-described problems.

It is an object of the present invention to provide a liquid crystal display having an anti-static electricity structure which can prevent a display error caused by a static electricity generated during manufacturing process and remained on an anti-electrical charge layer.

To achieve the above objects, the present invention provides a liquid crystal display system comprising: a pair of panels respectively having common electrodes and segment electrode; an insulating layer formed on each common and segment electrodes; an anti-electric charge layer formed on the insulating layer; a first earth pattern contacting the anti-electrical charge layer and formed at more than one of each common and segment electrode; and a second earth pattern formed at a circuit board and connected with the first earth pattern to earth a static electricity in a liquid crystal.

The anti-electrical charge layer and the first earth pattern are connected to each other by forming a cutting portion on the insulating layer, the cutting portion being corresponding to the first earth pattern.

The first earth pattern is formed on the outermost electrode of each common and segment electrode.

The anti-electrical charge layer extends to the cutting portion.

BRIEF DESCRIPTION OF THE DRAWING

Further objects and other advantages of the invention will become apparent from the following description in conjunction with the attached drawings, in which.

DETAILED DESCRIPTION OF THE PRESENT INVENTION

Figure 1A:
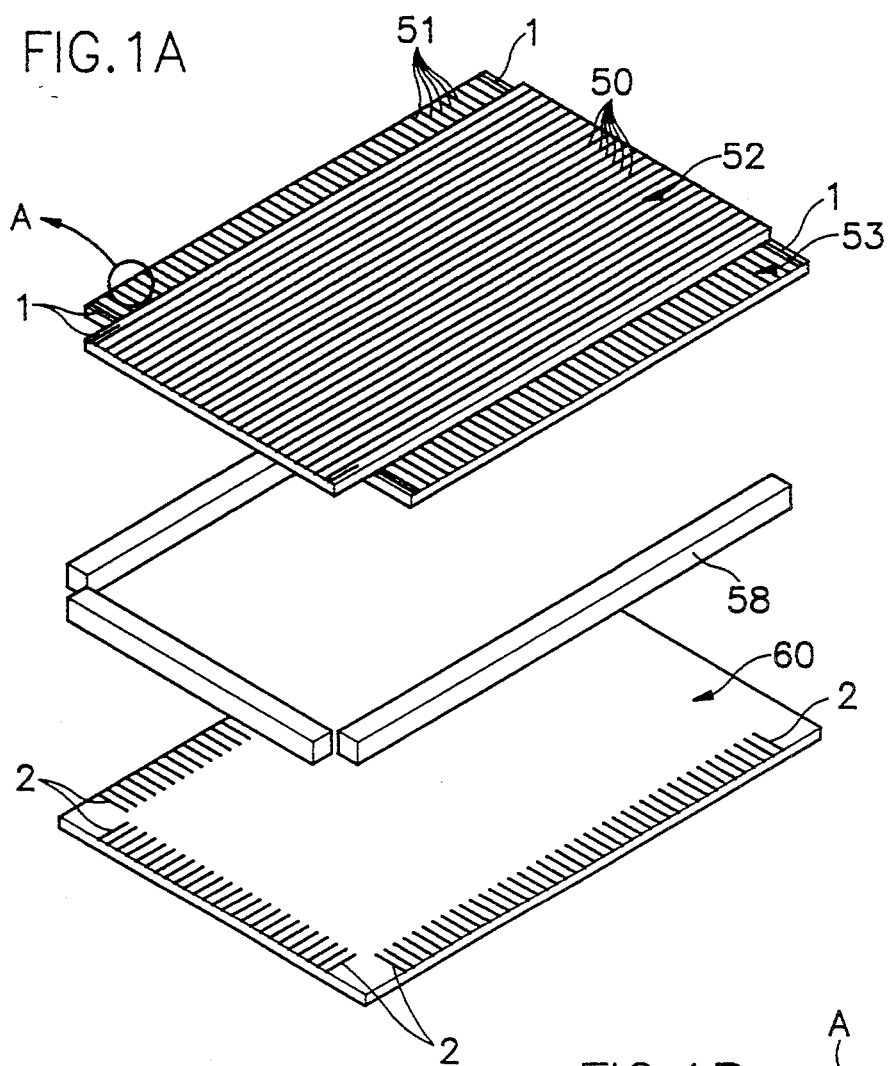
FIG. 1A is an exploded perspective view of an LCD system in accordance with a preferred embodiment of the present invention.
Figure 1B:
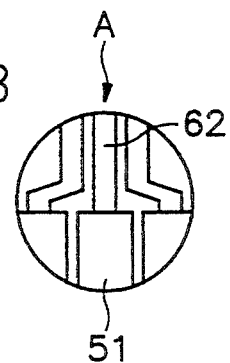
FIG. 1B is an enlarged view of section A in FIG. 1A.

Referring to FIGS. 1A and 1B, an LCD system comprises an LCD element including a pair of panels 52, 53 respectively having common electrodes 50 and segment electrodes 51 crossed to each other to form a matrix shape and lead patterns 62 extending from the electrodes 50, 51 outside; a connecter 58 contacting the lead pattern and a circuit board 60 connected with the connecter 58.

Further, a first earth pattern 1 is formed on each outermost electrode of common and segment electrodes 5, and a second earth pattern 2 is formed on a position of the circuit board which corresponds to the first earth pattern 1.

The LCD system as described above is fixed by a bezel and a case(not shown), and the system further comprises a back light 61 disposed between the LCD element and the circuit board 60.

The connecter 58 connects the first earth pattern 1 formed on the LCD element with the second earth pattern 2 formed on the circuit board 60.

Figure 2:
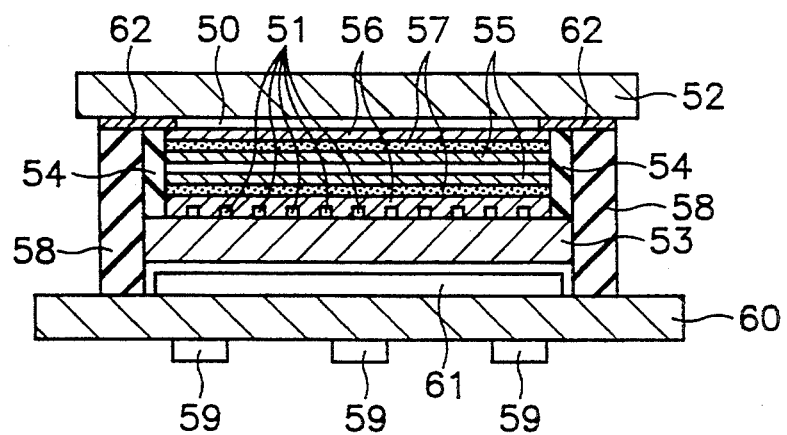
FIG. 2 is a sectional view of an LCD system in accordance with a preferred embodiment of the present invention.

Further, on each of the electrodes 50,51, an insulating layer 56, an anti-electrical charge layer 57 and an orientation layer 55 are formed in order, as shown in FIG. 2.

In the above described LCD system, when a signal is input to the lead pattern 62, a liquid crystal of a selected pixel is twisted, such that a selected light is emitted through a polarizer(not shown).

At this point, a static electricity generated during a rubbing process of the orientation layer is collected on the anti-electrical charge layer 57.

Figure 3A:
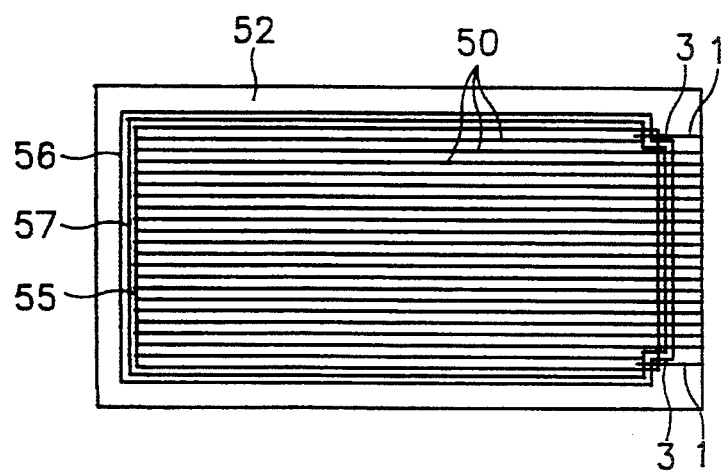
FIG. 3A is a plan view of an insulating layer covering a common electrode in accordance with a preferred embodiment of the present invention.
Figure 3B:
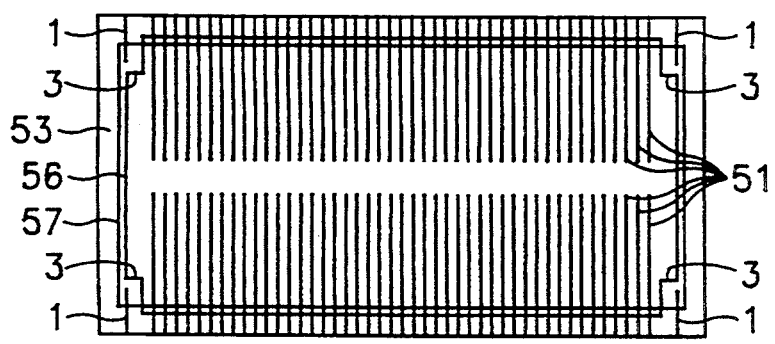
FIG. 3B is a plan view of an insulating layer covering a segment electrode in accordance with a preferred embodiment of the present invention.

The collected static electricity is not input to each of the electrodes 50,51 by the insulating layer 56, and as shown in FIG. 3, a cutting portion 3 is formed on the insulating layer 56 for the first earth pattern 1 formed on each of the outermost common and segment electrodes to contact the anti-electrical charge layer 57.

That is, the static electricity collected on the anti-electrical charge layer 57 is not input to each of the electrodes 50,51 while being input to the first lead pattern 1 through the cutting portion 3.

The static electricity input to the first earth pattern 1 is again input to the second earth pattern 2 formed on the circuit board 60 and output to exterior through an earth element(not shown).

The earth element is connected with the second lead pattern 2 on the circuit board 60.

Figure 4:
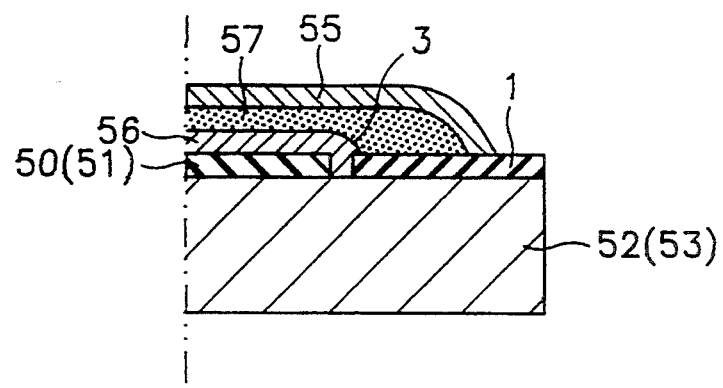
FIG. 4 is a partly enlarged sectional view illustrating the contacting state of a cutting portion of an insulating layer and an anti-electrical charge layer in accordance with a preferred embodiment of the present invention.
Figure 5:
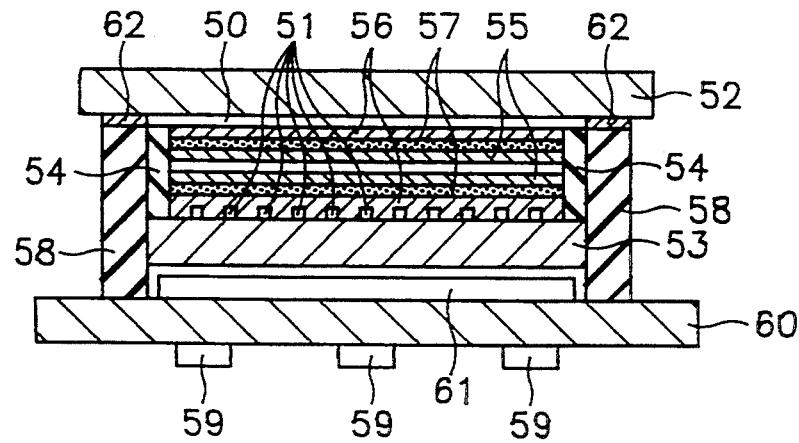
FIG. 5 is a sectional view of a conventional LCD system.

More in detail, as shown in FIG. 4, the contacting state of the cutting portion 3 of the insulating layer 56 and the anti-electrical charge layer 57 is such that the common(segment) electrode 50(51) forming the first lead pattern 1 thereon is formed on the panel 52(53), the insulating layer 56 covers the electrode 50(51) and anti-electrical charge layer 57 is formed on the insulating layer 56.

The orientation layer 55 is formed on the anti-electrical charge layer 57.

At this point, although the anti-electrical layer 57 contact the first lead pattern 1 through the cutting portion 3 of the insulating layer 56, since the thickness of the insulating layer and the anti-electrical charge layer is several micro meters, the contacting error is not occurred.

As describe above, the present invention comprises the first lead pattern formed on each outermost common and segment electrode, the second lead pattern formed on the circuit board, and the cutting portion formed on the insulating layer for the first lead pattern to contact the anti-electrical layer, such that the static electricity can be output to exterior thereby preventing the display error.

Although preferred embodiments of the present invention have been described in detail hereinabove, it should be clearly understood that many variations and/or modifications of the basic inventive concepts herein taught which may appear to those skilled in the pertinent art will still fall within the spirit in the appended claims.

I claim:

1. A portion of a liquid crystal display system comprising:
    a panel;
    electrodes formed on the panel;
    an insulating layer covering the electrodes;
    an anti-electrical charge layer covering the insulating layer;
    an orientation layer covering the anti-electrical charge layer;
    a first earth pattern formed on the panel, wherein the first earth pattern is electrically isolated from the electrodes by the insulating layer, and wherein the first earth pattern is in contact with the anti-electrical charge layer and the orientation layer; and
    a second earth pattern connected with the first earth pattern to earth a static electricity in a liquid crystal.

2. A portion of liquid crystal display of claim 1, wherein the second earth pattern is formed on a circuit board.

3. A portion of liquid crystal display of claim 1, wherein the anti-electrical charge layer and the first earth pattern are connected to each other by a cutting portion of the insulating layer, wherein the cutting portion extends along a portion of the panel corresponding to the first earth pattern.

4. A portion of liquid crystal display of claim 1, wherein the first earth pattern is formed on electrodes located at an outermost position on the panel.

5. A portion of liquid crystal display of claim 3, wherein the anti-electrical charge layer is extended into the cutting portion of the insulating layer.

6. A liquid crystal display system comprising:
    a pair of panels having common electrodes and segment electrodes interposed therebetween;
    an insulating layer formed on each common and segment electrode;
    an anti-electrical charge layer formed on the insulating layer;
    an orientation layer formed on the anti-electrical charge layer;
    a first earth pattern contacting the anti-electrical charge layer and orientation layer, wherein the first earth pattern is formed at more than one of each common and segment electrode; and
    a second earth pattern connected with the first earth pattern to earth a static electricity in a liquid crystal.

7. A liquid crystal display system of claim 6, wherein the second earth pattern is formed on a circuit board.

8. A liquid crystal display system of claim 6, wherein the anti-electrical charge layer and the first earth pattern are connected to each other by a cutting portion formed in the insulating layer, and wherein the cutting portion extends along a portion of the panels corresponding to the first earth pattern.

9. A liquid crystal display system of claim 6, wherein the first earth pattern is formed on common and segment electrodes located along outermost positions of the panels.

10. A liquid crystal display system of claim 7, wherein the anti-electrical charge layer extends to a cutting portion of the insulating layer extending along an electrode.

* * * * *